No. 704,150. Patented July 8, 1902.
H. VAN PATTON.
REFRACTO-OPHTHALMOMETER.
(Application filed Oct. 30, 1901.)
(No Model.) 2 Sheets—Sheet 1.
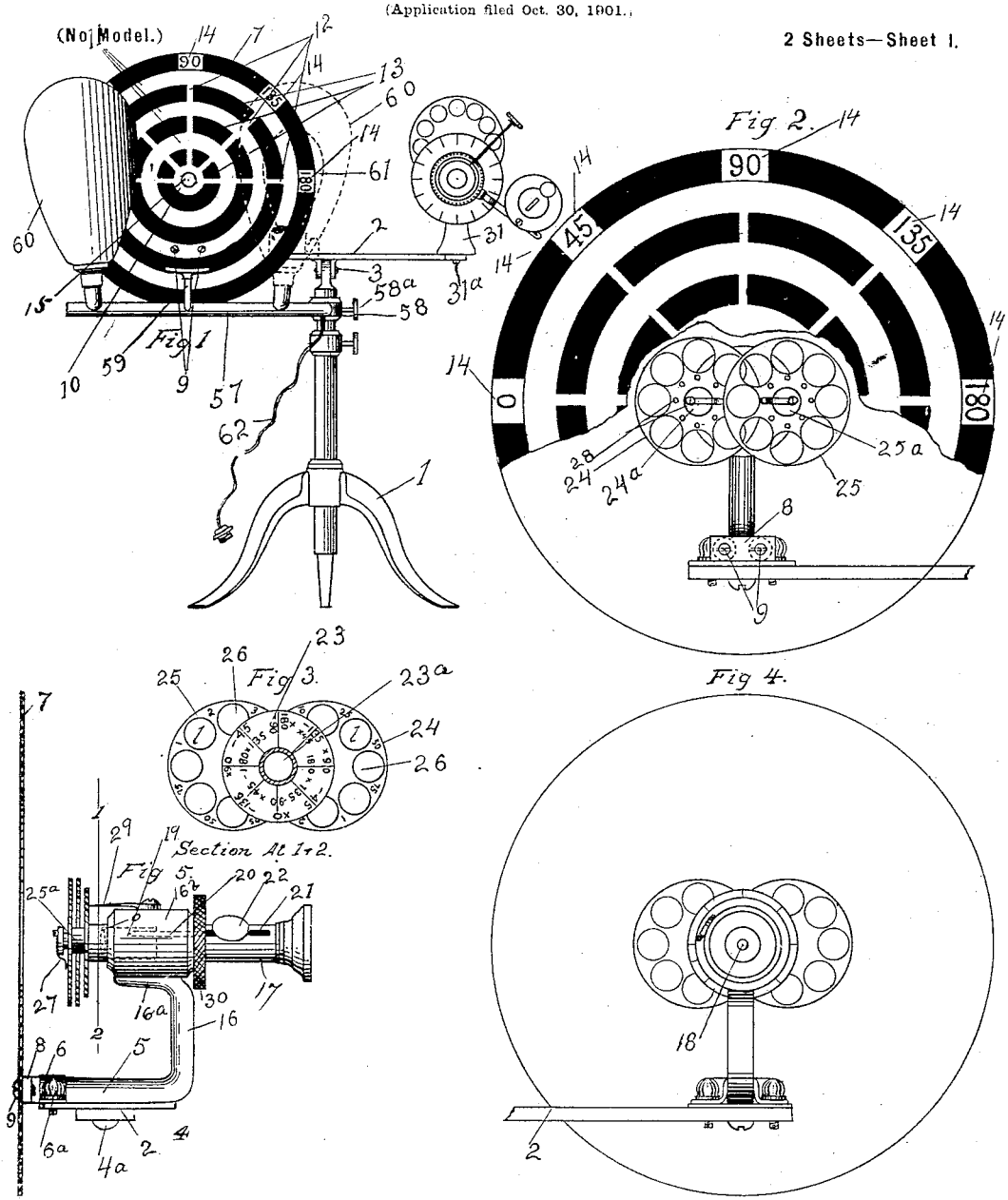
Witnesses.
Carl A. Doubt
John A. Northam
Inventor:
Herbert Van Patton
per D. A. Gourick
Attorney.

No. 704,150. Patented July 8, 1902.
H. VAN PATTON.
REFRACTO-OPHTHALMOMETER.
(Application filed Oct. 30, 1901.)
(No Model.) 2 Sheets—Sheet 2.
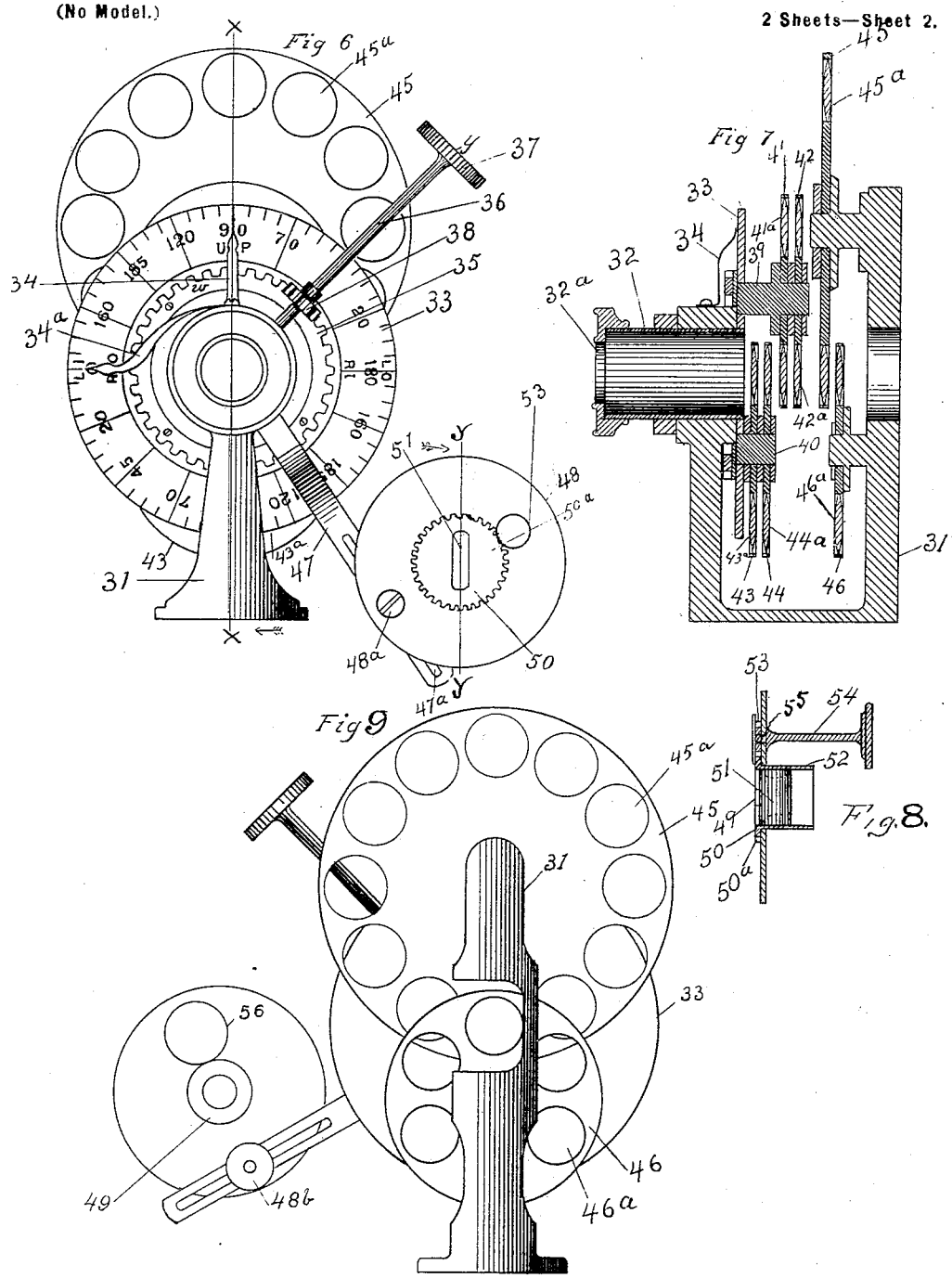

UNITED STATES PATENT OFFICE.

HERBERT VAN PATTON, OF MEADVILLE, PENNSYLVANIA.

REFRACTO-OPHTHALMOMETER.

SPECIFICATION forming part of Letters Patent No. 704,150, dated July 8, 1902.

Application filed October 30, 1901. Serial No. 80,545. (No model.)

*To all whom it may concern:*

Be it known that I, HERBERT VAN PATTON, a citizen of the United States, residing at Meadville, in the county of Crawford and State of Pennsylvania, have invented certain new and useful Improvements in Refracto-Ophthalmometers, of which the following is a specification.

My invention relates to devices for determining astigmatism and muscular insufficiency in the human eye, and has for its object to provide an instrument combining the means for measuring astigmatism objectively and subjectively and also for determining the degree of muscular insufficiency.

In the drawings, Figure 1 is a front elevation of the complete instrument; Fig. 2, a fragmental view of the instrument for measuring astigmatism objectively; Fig. 3, a view of the lenses and disk used in the objective instrument; Fig. 4, a rear view of the objective instrument; Fig. 5, a side view in elevation of same; Fig. 6, a front view in elevation of the subjective instrument and the device for determining muscular insufficiency; Fig. 7, a view in cross-section of Fig. 6 on line $x\,x$ looking in the direction of the arrow; Fig. 8, a like view of Fig. 6 on line $y\,y$ looking in the direction of the arrow, and Fig. 9 a rear view of Fig. 6.

Referring to the drawings, in which similar reference characters indicate like parts in all the views, the base of my instrument is indicated by the numeral 1, having the horizontal bar 2 secured thereto at 3. A plate 4 is secured to one end of the bar 2 by means of screw $4^a$, which in turn supports a rod 5, secured to said plate by means of the strap-iron 6 and screws $6^a$. A disk 7 is secured to the T-shaped end 8 of the rod 5 by the screws 9. The front of disk 7 has a background of black, on which is painted a center of white 10 and concentric circular bands of white 11.

12 represents five radial white lines intersecting the three inner black bands 13, two lines being on the horizontal, one on the perpendicular, and lines at forty-five degrees from horizontal. In the marginal circle of black white spaces 14 are provided, in which are inserted numerals indicating the angle of the lines 12, beginning at the left as zero and continuing to one hundred and eighty degrees. A hole 15 is provided in the center of the disk. The rod 5 has an upwardly-extending arm 16, having a shoulder $16^a$ at the end thereof, on which is supported a barrel portion $16^b$, in which is mounted for rotation an eye-tube 17, provided with a suitable minus lens 18 in its sight end, while inside the tube 17 is a smaller tube 19, carrying a plus lens and arranged for adjustment with the lens 18 by means of the rod 20, extending through the slot 21 in tube 17, surmounted by the button 22. 23 represents a disk mounted over the end of tube 17, which is marked, as shown in Fig. 3, to indicate degrees of a circle. The disk 23 has its center cut out, as shown at $23^a$, so as not to obstruct the view of the eye of patient as seen through the tube 17 by the operator.

24 and 25 represent disks revolubly mounted on the side of disk 23 by means of the studs $24^a$ and $25^a$, diametrically arranged on said disk on the side toward the disk 7. The disks 24 and 25 have mounted near their periphery a series of lenses 26 of varying strength, those in disk 24 being plus lenses, while those in the disk 25 are minus lenses, and the two disks 24 and 25 are so arranged that the lenses may be successively turned into the line of vision of the eye-tube 17.

27 represents a spring-clamp secured to the head of each stud $24^a$ and $25^a$ to press against the disk mounted on the respective stud and has a projection on the side toward the disk to fit into holes 28 in the disk, this construction being intended to insure a centering of the lens. Should it be desired to change the disk on either stud, it may be done by removing the spring-clamp 27 on the head of the stud, thus permitting the removal of the disk and the placing of another, after which the spring-clamp is again secured to the head of the stud.

29 is a pointer on the top of the barrel portion $16^b$.

31 represents the frame of my subjective instrument, secured to the rod 2 by means of the screw $31^a$, having the eye-tube 32 mounted for rotation therein, which has the opening $32^a$, through which the patient looks.

33 represents a disk secured to the end of the eye-tube 32. The disk 33 has its edge divided into degrees of a circle, beginning at zero and running on each side of zero to one hundred and eighty degrees on the opposite side thereof.

34 and 34ª represent pointers secured to the top of the frame 31, the two pointers being arranged to indicate points on the disks 33 ninety degrees from each other.

35 is a circular rack secured to the surface of disk 33, and 36 a shaft mounted in the frame 31, which may be turned by means of the milled head 37, and having the pinion-gear 38, adapted to mesh with the rack 35 to revolve the disk 33. On the inside of the frame 31 and mounted for rotation on the disk 33 by means of the studs 39 and 40 are disks 41, 42, 43, and 44, having lenses 41ª, 42ª, 43ª, and 44ª, respectively, arranged in a series near the periphery of said disks and also so arranged that each lens may be brought successively into the line of vision of the tube 32.

45 and 46 are disks carrying lenses 45ª and 46ª, arranged near the periphery of the disks, and are intended to determine the lenses necessary to correct other optical deficiencies that may be discovered.

47 is an arm revolubly mounted on eye-tube 32 and having near its free end a slot 47ª.

48 is a disk having a screw 48ª inserted in the slot 47ª and having a set-screw 48ᵇ to hold the disk 48 in any desired position on the arm 47. The disk 48 has a circular aperture 49 in its center. A disk 50, having a cylindrical glass rod 51 mounted in its center, is fixed for rotation in the aperture 49 by means of the tube 52, secured to the end of said disk. The periphery of disk 50 is cut into a circular rack 50ª, which meshes with a pinion 53 on the end of shaft 54, journaled in disk 48 through an aperture 55 therein.

56 is a circular head on shaft 54 to rotate said shaft.

57 is a rod mounted by means of a loop 58 to the base 1, and is vertically adjusted thereon by means of the set-screw 58ª.

59 is a chin-rest mounted on the rod 57, and 60 reflectors behind electric-light globes 61.

62 is a wire to convey the electricity to the globes 61, the rod 57 being made, preferably, tubular to receive the wire.

The operation is as follows: The patient rests his chin on the chin-rest 59 and looks with one eye through the hole 15 in disk 7, the height of the chin-rest being adjusted, by means of the rod 57, loop 58, and set-screw 58ª, to suit the patient. The electric lights 61 are then turned on and the operator, looking through the eye-tube 17 at the eye of the patient, sees the concentric black and white bands 11 and 13 on the face of disk 7 on the cornea of patient's eye. Should these black and white bands not be circular, but appear flattened, an astigmatism exists, and the disks 24 and 25 are successively revolved into the line of vision until the reflection of the circular bands appears as circles on the cornea of the eye of the patient. The lenses in the eye-tube 17 may be adjusted to enlarge or diminish the size of the reflection as it appears to the operator by moving the tube 19 away from or toward the eye of the patient, as desired, by means of the button 22. Having thus determined the cylinder of the lens required to correct the astigmatism of the cornea of the eye and should the white lines 12 of the reflection not appear in their proper place, the eye-tube 17 is revolved by means of the milled ring 30 until the lines 12 appear in their proper places. The pointer 29 will then indicate on the disk 23 the axis of the astigmatism. The other eye is then examined in the same way. Having determined the lenses and their axes required to correct the astigmatism in each eye by means of the objective instrument as above described, one of the patient's eyes is placed at the opening 32ª of the eye-tube 32 and looks at a chart at a distance of twenty feet. The lenses in disks 41 and 42 are rotated so as to form the same combination of lenses as had been formed by the use of the objective instrument to correct the astigmatism in that eye while the disk 33 is revolved by rotating the shaft 36, so that the same axis of the lens is turned as was shown to be required by the disk 23 and pointer 29. The lenses in disks 45 and 46 are then turned into line of sight until the patient is able to read the matter on the chart clearly. The disk 48 is then adjusted opposite the other eye than that being examined, so that the cylindrical glass rod 51 is opposite the pupil thereof and both eyes look at a flame at a distance of twenty feet. The eye at opening 32ª will see the flame naturally, while the eye opposite the rod 51 will see it as a streak of light. Any deviation of the streak of light as seen by eye looking through glass cylinder 51 from center of light as seen by eye looking through 32ª indicates muscular insufficiency. To correct this fault, the lenses in disks 43 44 are rotated before the eye at opening 32ª until the proper combination is obtained to throw the streak of light back so as to cross the light as seen by the eye looking through glass rod 51. The cylindrical rod 51 may be rotated by means of the gearing 50ª and 53 to any angle desired by the operator and as he may think necessary to complete the test. The same operation is repeated as to the other eye of the patient.

Having described my invention, what I claim is—

1. In a device for correcting deficiencies in eyesight, a disk having a central aperture, concentric black and white bands thereon and lines indicating degrees of a circle, a telescopic eye-tube at the rear thereof opposite said central aperture, a disk around the end of said tube, lines on said disk indicating the degrees of a circle, and disks revolubly mounted on said disk each having a multiplicity of lenses arranged in a series near its periphery, substantially as shown and described.

2. In a device for correcting deficiencies in eyesight, a suitable standard, a bracket mounted thereon, a disk attached thereto having a central aperture, concentric circular bands of black and white on the front of said disk and radial lines crossing said bands indicating degrees of a circle, the rear of said bracket extended upward to support a barrel portion, a telescopic eye-tube mounted in said barrel portion, and disks, having a multiplicity of lenses arranged near their periphery, mounted to rotate said lenses into the line of vision of said eye-tube, substantially as shown and described.

3. In a device for correcting deficiencies in eyesight, a suitable standard, a bracket mounted thereon, a disk mounted on said standard, concentric circular bands of black and white on the front of said disk and radial lines crossing said bands indicating degrees of a circle, the rear of said bracket extended upward and supporting a barrel portion, an eye-tube mounted in said barrel portion, a disk around the end of said tube, radial lines on said disk indicating degrees of a circle, disks revolubly mounted on said disk each having set therein a series of lenses near its periphery, a bar arranged for vertical adjustment on said standard and a chin-rest on said bar, substantially as shown and described.

4. In a device for correcting deficiencies in eyesight, an eye-tube arranged for rotation, a disk mounted around the end thereof, a multiplicity of disks revolubly mounted on said disk and having set therein a series of lenses near their periphery, and means for rotating said eye-tube and disks, substantially as shown and described.

5. In a device for correcting deficiencies in eyesight, an eye-tube arranged for rotation, a disk mounted around the end of said eye-tube, the front of said disk being divided by radial lines into degrees of a circle, means for rotating said eye-tube and disk, studs on rear of said disk, disks revolubly mounted on said studs and a series of lenses set in each said disk near its periphery, substantially as shown and described.

6. In a device for correcting deficiencies in eyesight, a frame suitably mounted, an eye-tube revolubly mounted thereon, a disk mounted around the end of said eye-tube having its face divided by radial lines in degrees of a circle, pointers on said frame indicating points on said disk ninety degrees removed from each other, a circular rack fixed on said disk, a shaft journaled in said frame, and a pinion-gear keyed to the shaft meshing with said circular rack, substantially as shown and described.

7. In a device for correcting deficiencies in eyesight, a frame suitably mounted, an eye-tube journaled therein, a disk mounted around the end of said eye-tube having its face divided by radial lines in degrees of a circle, pointers on said frame indicating points on said disk ninety degrees removed from each other, a circular rack fixed on said disk, a shaft journaled in said frame, a pinion-gear keyed to the shaft meshing with said circular rack, disks mounted for rotation on the rear of the first-mentioned disk, each of said disks having a series of lenses set near its periphery, substantially as shown and described.

8. In a device for determining muscular insufficiency in eyes, a frame suitably mounted, an eye-tube journaled therein, means attached to said eye-tube and to said frame for determining focal deficiencies in eyesight, an arm revolubly mounted on said eye-tube having a slot near its free end, a disk adjustably mounted in said slot to regulate the distance between said eye-tube and said disk to the distance between the pupils of the eyes of the patient, and a cylindrical glass rod revolubly mounted in said disk, substantially as shown and described.

9. In a device for determining muscular insufficiency in eyes, a frame suitably mounted, an eye-tube journaled therein, means attached to said eye-tube and to said frame for determining focal deficiencies in eyesight, an arm revolubly mounted on said eye-tube having a slot near its free end, a circular plate mounted in said slot and adapted to be adjusted longitudinally of said arm, a cylindrical glass rod set in a disk journaled in said circular plate, a rack on the edge of said disk, and a gear-wheel meshing with said rack and adapted to rotate said disk, substantially as shown and described.

In testimony whereof I have signed my name to this specification in the presence of two subscribing witnesses.

HERBERT VAN PATTON.

Witnesses:
 CARL DOUBET,
 JOHN A. NORTHAM.